US 6,657,749 B1

(12) United States Patent
Beeson

(10) Patent No.: US 6,657,749 B1
(45) Date of Patent: Dec. 2, 2003

(54) SCANNER USING LENS ARRAY PRODUCING INVERTED IMAGES

(75) Inventor: Karl W. Beeson, Princeton, NJ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/164,483

(22) Filed: Oct. 1, 1998

(51) Int. Cl.⁷ .............................. H04N 1/40; H04N 1/04; G02B 27/10
(52) U.S. Cl. ..................... 358/471; 358/475; 359/621
(58) Field of Search ........................ 358/471; 359/621

(56) References Cited

U.S. PATENT DOCUMENTS 5,731,899 A * 3/1998 Meyers ..................... 359/621
5,768,023 A 6/1998 Sawaki et al. ............. 359/622
5,973,844 A * 10/1999 Burger ....................... 359/621
6,137,535 A * 10/2000 Meyers

* cited by examiner

*Primary Examiner*—Edward Coles
*Assistant Examiner*—Houshang Safaipour
(74) *Attorney, Agent, or Firm*—Kris T. Fredrick

(57) ABSTRACT

An optically-based and image processing-based scanner including a lens array, an imager, and an array of baffles to define paths of light between the lenses and the imager. Each of the lenses produces an inverted image of a portion of the object to be imaged. Components in the imager transpose and filter the individual images, or vice-versa, and assemble a composite image of the entire object. An array of plano-convex lenses is preferred.

14 Claims, 5 Drawing Sheets

SCANNER USING LENS ARRAY PRODUCING INVERTED IMAGES

FIELD OF INVENTION

The invention relates to a scanner that uses both optics and image processing to produce a scanned image, and more particularly to a scanner using an array of lenses that produce inverted sub-images for which the inverted data thereof is transposed and assembled into a complete image.

BACKGROUND OF THE INVENTION

Prior art scanners, such as might be used in a stand-alone manner or in a photocopier or facsimile machine, typically scan one line of pixels of the object document at a time. Such prior art which utilizes arrays of imaging lenses typically performs 1:1 imaging, i.e., neither reducing or enlarging, using non-inverted optical images. An example of a lens system that produces such 1:1 non-inverted images is an array of gradient-index (GRIN)lenses. An advantage of using the GRIN-lens array is that a 1:1 non-inverted imaged can be produced entirely with optics, i.e., without the need for image processing.

Currently, the highest resolution GRIN lens array-based scanner is 300–400 dots per inch (dpi), but a 600 dpi GRIN lens array-based scanner is anticipated to be commercially available soon. The technology for a 1200 dpi GRIN lens array-based scanner is not yet, and might not be for a long time, available.

A disadvantage of a GRIN lens array-based scanner is that it has a poor depth of field (DOF), i.e., a DOF less than 0.5 mm. A typical DOF for prior art GRIN lens array-based scanner is 0.2 mm or 0.3 mm.

It is desirable to have a DOF that is greater than 0.5 mm, and preferably 1.0 mm or better. A smaller DOF produces a scanner that is not robust. For example, if a piece of paper does not lie completely flat on the platen of the scanner because it has a crease in it, then the typical prior art DOF of 0.2 mm or 0.3 mm causes the image corresponding to the crease in the paper to be out of focus.

Having a depth of focus of 0.3 mm or less means that the mechanical positioning tolerances of the platen, lens array and optical-energy to electrical-energy converter must be less than 0.3 mm. This is difficult to manufacture with a low defect rate.

As resolutions increase, the problems of GRIN lens array-based scanners will increase. For a given GRIN lens array, changing the optical-energy to electrical-energy converter from 600 dpi to 1200 dpi will cut the DOF approximately in half. Thus, if the DOF was 0.3 mm at 600 dpi, it will be approximately 1.5 mm at 1200 dpi with the same GRIN lens array.

Prior art scanners that scan one line of a document at a time typically have an imager (for converting the optical image into electric signals) that is the width of the line to be scanned. For a document on 8.5 inch by 11 inch paper that is in the portrait (rather than the landmark) format, the imager needs to be 8.5 inches wide. Such a prior art imager is formed from a sequence of smaller, e.g., 1 inch, imagers, e.g., charge coupled devices (CCDs), connected end-to-end together.

The joint between two CCDs represents a non-imaging area on the order of one picture imaging element (pixel) wide. When used with a GRIN lens array, the non-imaging joints in the composite imager result in lost image data because the GRIN lens array produces a 1:1 image, a small portion of which impinges on the joints. Thus, either image information at the joints is lost or interpolation must be performed on the image data derived from the image formed by a GRIN lens array, which is a problem.

SUMMARY OF THE INVENTION

An objective of the invention is to improve upon the deficiencies of the prior art GRIN lens array-based scanners. In particular, an objective of the invention is to provide a scanner having a more robust depth of field (DOF) than the prior art GRIN lens array-based scanners. Also, an objective of an invention is to provide a scanner that is more economical to produce than the prior art GRIN lens array-based scanners.

These and other objectives of the invention are achieved by providing an imaging apparatus comprising: a lens array including a plurality of lenses, each lens in said lens array forming an inverted optical image of a portion of an object; an imager to convert the plurality of inverted optical images into image data; and a baffle array including a plurality of parallel light absorbing baffles, each baffle in said baffle array forming a light absorbing border between adjacent optical paths, said paths lying between said lens array and said imager.

These and other objects of the invention are also fulfilled by providing a method of calibrating an imaging apparatus (the imaging apparatus including a lens array, each lens in said lens array forming an inverted optical image of a portion of an object, an imager including an optical-energy to electrical-energy converter to convert the plurality of inverted optical images into a plurality of inverted image data sets corresponding thereto, respectively, each of said inverted data sets being a sequence of data having a beginning part, a middle part and an end part, and a controller to filter said sequence so as to discard said beginning and end parts and retain said middle part, and a baffle array, each baffle in said baffle array forming a light absorbing border between adjacent optical paths, said paths lying between said lens array and said imager), the method comprising: providing a calibration pattern of bars alternating between a first color and a contrasting second color, wherein widths of said bars of said calibration pattern are fixed such there is a first transition and a second transition in said calibration pattern from said first color to said second color approximately aligned with a first and second edge, respectively, of each lens in said array thereof; determining, at least indirectly based upon each of said inverted data sets, a first and second indicator of where said first transition and said second transition occur in each of said inverted data sets, respectively; and storing said first and second indicators for each of said inverted data sets.

These and other objects of the invention are also fulfilled by providing a method of forming an imaging apparatus, the method comprising: forming a lens array including a plurality of lenses, each lens in said lens array refracting an inverted optical image of a portion of an object; providing an imager to convert the plurality of inverted optical images into image data; forming a baffle array including a plurality of parallel light absorbing baffles separated by air gaps and one of a top baffle and a bottom baffle; aligning said lens array to a first end of said baffle array such that each baffle in said baffle array forms a light absorbing border between adjacent optical paths, said paths lying between said lens array and said imager; attaching said lens array to said baffle array; and attaching said imager to said baffle array.

The foregoing and other objectives of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit the present invention and wherein.

DETAILED DESCRIPTION OF THE PREFERRED EMBODIMENTS

Figure 1:
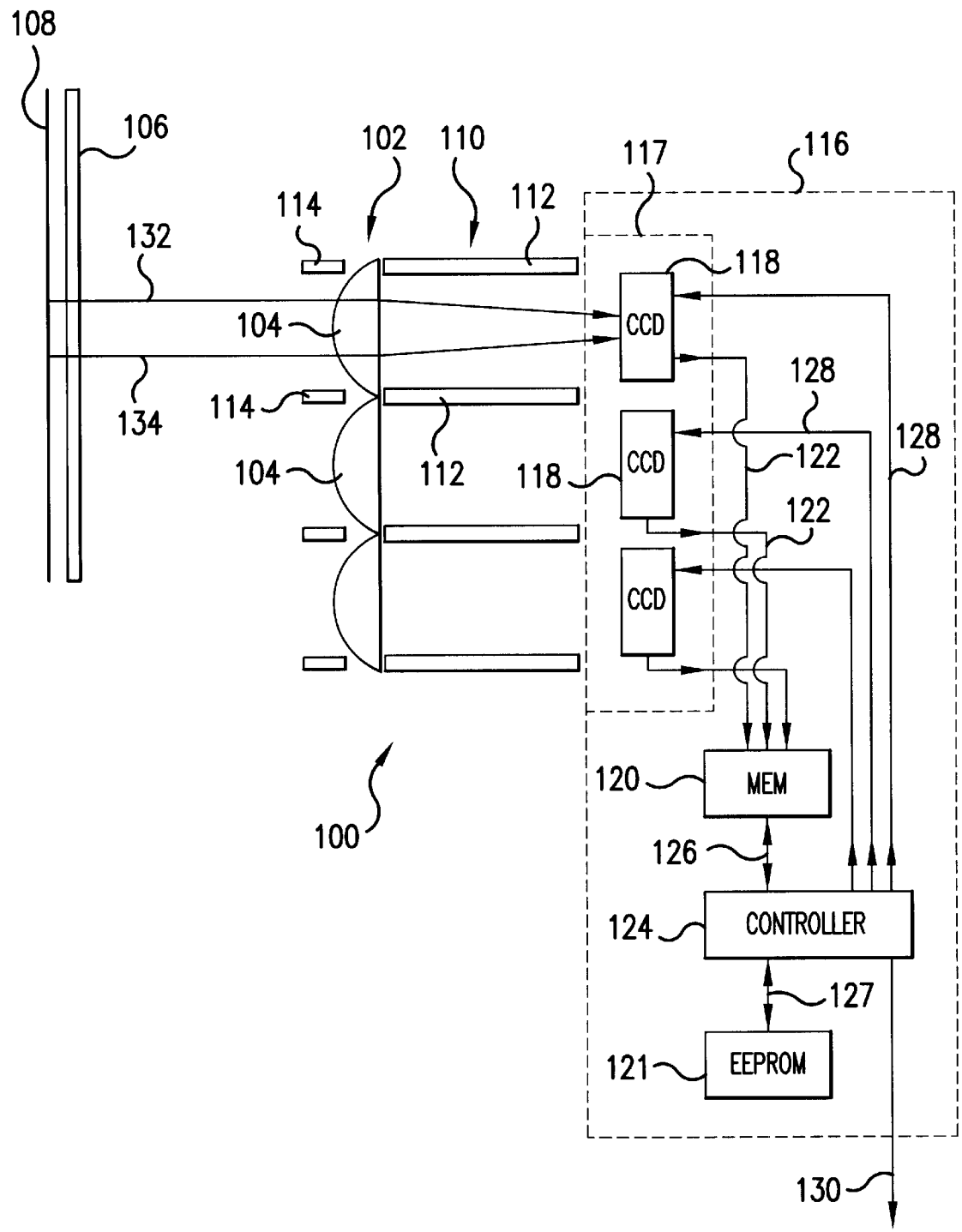
FIG. 1 is a block diagram of an optics-based and image-processing-based scanner according to the invention.

FIG. 1 is a block diagram of the optics-based and image-processing-based scanner 100 according to the invention. The scanner 100 includes an array of lenses 102, which in this example is formed of plano-convex lenses 104. The array of lenses 102 faces an object document 108 laying against an optional platen 106. The array of lenses 102 is arranged with an array of baffles 110. Each baffle includes a first part 112 and a second optional part 114. The array of baffles 112 separates the array of lenses 102 from an imager 116.

The lenses 104 in the array 102 thereof may be any type of refracting lenses such as, e.g., plano-convex lenses, bi-convex lenses, or lenses having one convex surface and one concave surface. The surface curvature of the lens 104 may be either spherical or aspherical. The lenses 104 are preferably spherical, plano-convex lenses. The planar surfaces of the lenses 104 face the imager 116 while the convex surfaces of the lenses 104 face the platen 106. The figures depict 3 lenses 104 in the array 102 for simplicity, but any number of lenses can be used.

The imager 116 of FIG. 1 includes an optical-energy to electrical-energy converter 117, such as one or more charge coupled devices (CCDs), one or more complimentary metal oxide semiconductor (CMOS) detectors, or one or more photonics-technology-based detectors. Each converter 117 has a plurality of pixel detectors. FIG. 1 depicts the converter 117 as a plurality of charge coupled devices (CCDs) 118 commensurate in number with the number of lenses 104 such that there is one CCD 118 for each lens 104. The CCDs 118 are connected to an optional but preferred memory 120 via signal lines 122. Note that it is not necessary that the number of CCDs 118 equals the number of lenses 104.

The memory 120 is connected to a controller 124 via a bi-directional connection 126. The controller 124 is preferably a microprocessor embodied on an integrated circuit. The controller is also directly connected to the CCDs 118 via control lines 128. An output 130 of the controller 124 delivers the scanned image data. An optional but preferred non-volatile memory, such as a electrically erasable programmable read-only memory (EEPROM), 121 is connected via a bi-directional signal path 127 to the controller 124.

The baffles 112 and optionally but preferably 114 of the array thereof 110 form light absorbing borders alongside optical paths between the lenses 104 and the CCDs 118, respectively. The baffles 112 and 114 are made to be light absorbing to reduce the amount of light reaching the CCD 118 which did not reflect off the corresponding portion of the object. The material for the baffles should be inherently light absorbing and/or coated with a light absorbing substance.

Figure 2:
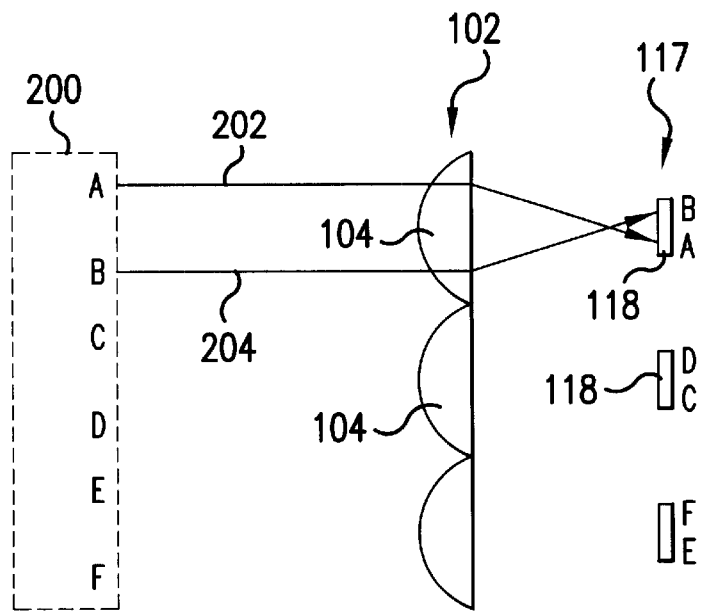
FIG. 2 is a diagram of the image inversion caused by the lens array of the embodiment of Figure

FIG. 2 is a diagram illustrating how each lens 104 in the array thereof 102 refracts light from the corresponding portion of an object 200 as denoted by only two, for simplicity, rays of light 202 and 204. The image on the corresponding CCD 118 in the converter 117 is inverted. The ray 202 from the area A (which is above the area B) of the object 200 is imaged on the CCD 118 below the image for the area B. Also, it is noted that the area AB of the image sensed by the CCD 118 is smaller than, i.e., reduced relative to, the area AB of the object 200 that corresponds to the lens 104 through which the rays 202 and 204 travel.

Figure 3:
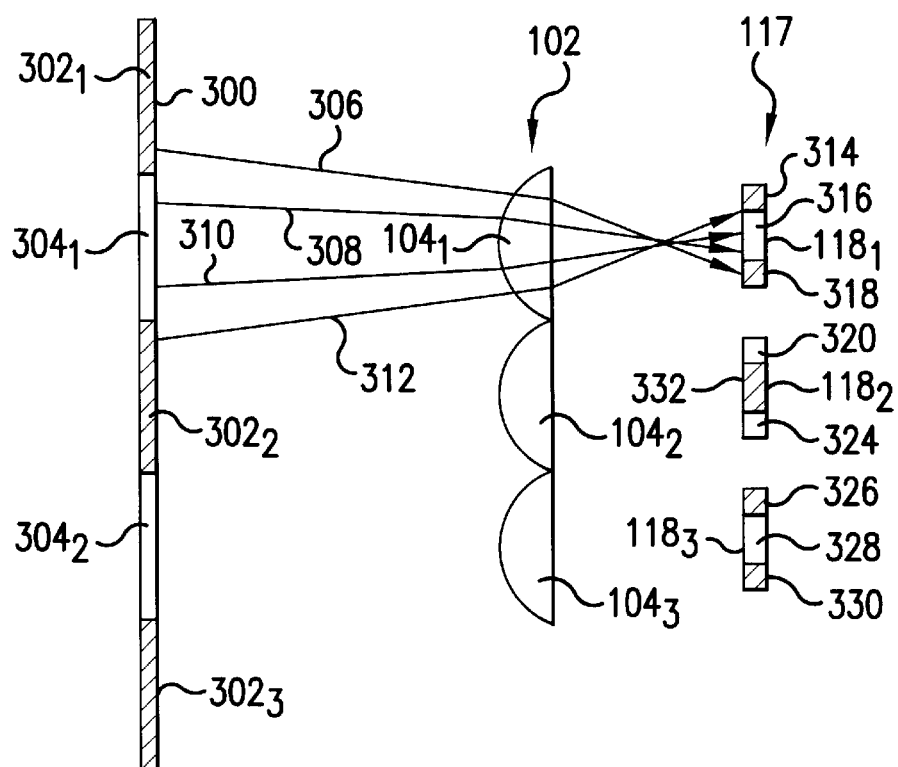
FIG. 3 is a diagram depicting the image of the calibration pattern formed by the lens array of the embodiment of FIG. 1.

FIG. 3 is a diagram illustrating the relationship between the array 102 of lenses 104 and a calibration pattern 300, resulting in the patterned images on the CCDs 118. The pattern 300 has black portions 302 and white portions 304, each of which is equal in width to the width of the lenses 104. However, any repeating pattern of alternating, contrasting colors will suffice so long as transitions between colors in the repeating pattern approximately coincide or align with the edges of each lens. Knowing the number of transitions that should be completely imaged by each CCD 118 makes it possible to calibrate the converter 117, as will be discussed further below.

In FIG. 3, the top lens $104_1$ is aligned with a white portion $304_1$ of the calibration pattern 300. A black portion $302_2$ of the calibration pattern 300 is aligned with the second lens $104_2$ while a white portion $304_2$ is aligned with the third lens $104_3$.

Because the array 102 of lenses 104 produce a corresponding plurality of reduced images, the charge distribution in the CCDs 118 represent a complete image of the portion of the calibration pattern to which the corresponding lens 104 is aligned, plus partial images of the portions of the calibration pattern immediately above and below the calibration pattern 300 to which the lens is aligned. More particularly, the CCD $118_1$ has a beginning part 314 of the charge distribution that represents the black portion $302_2$ of the calibration pattern 300, a middle part 316 that represents the white portion $304_1$ of the calibration pattern 300 and an end part 318 representing the black portion $302_1$ of the calibration pattern 300. Similarly, the charge distribution in the CCD $118_2$ has a beginning part 320 corresponding to the white portion $304_2$, a middle part 322 corresponding to the black portion $302_2$, and an end part 324 corresponding to the white portion $304_1$. The charges in the beginning portion 314, the end portion 318 and the middle portion 322 represent the color black, while the charges in the middle part 316, the beginning part 320 and the end part 324 represent the color white.

The end part 318 of the charge distribution in the first CCD $118_1$ represents light such as the ray 306 coming from the black portion $302_1$ of the calibration pattern. The beginning part 320 of the charge distribution in the CCD $118_2$ represents light from the white portion $304_2$. Thus, the end part 318 and the beginning part 320 represent noncontiguous areas of the calibration pattern 300.

If a person were to concatenate the image data provided by the CCDs 118, the result would be a distorted representation of the calibration pattern 300. However, if one can concatenate the middle parts 316, 322, 328 etc., then the resultant image would be an accurate representation of the calibration pattern 300. A technique for such filtration is described below.

Figure 4:
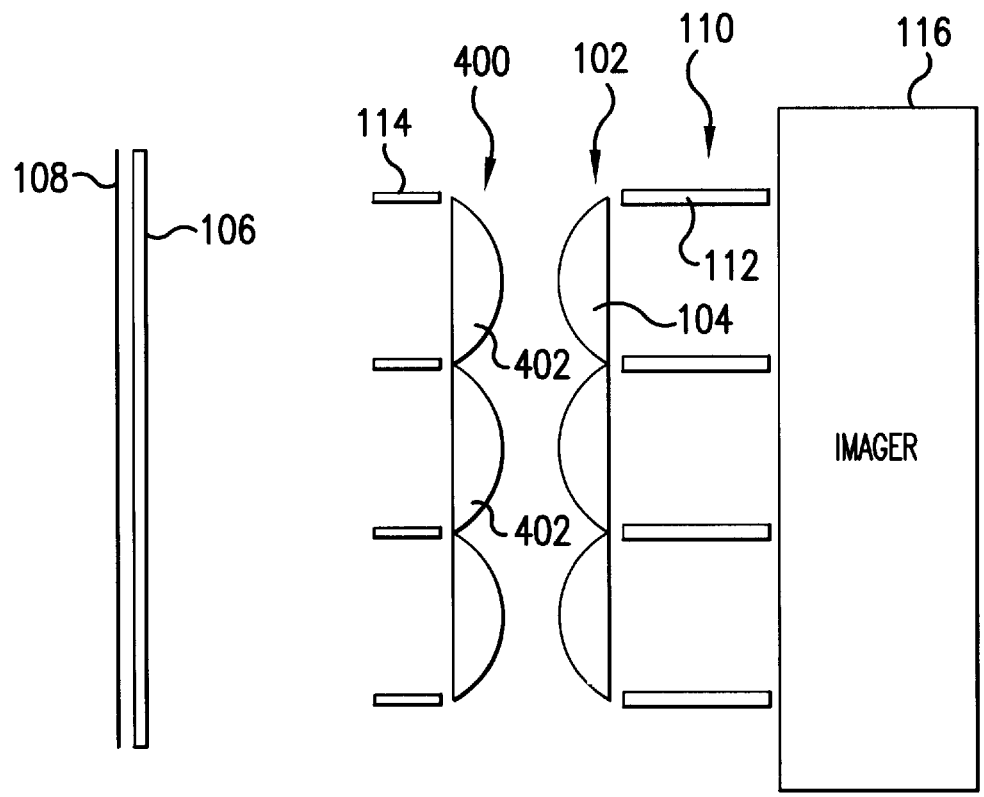
FIG. 4 is a second embodiment of the invention that uses different optics than the embodiment of FIG. 1.

FIG. 4 is a diagram of an alternative embodiment of the scanner according to the invention that differs from the embodiment of FIG. 1 by including a second array 400 of lenses 402. In the example of FIG. 4, the lenses 402 are plano-convex lenses. The convex surfaces of the lenses 402 face the convex surfaces of the lenses 104.

The extra array of lenses 400 of FIG. 4 contribute to images in the CCDs 118 that have fewer aberrations. However, it is more preferred to use only the array 102 of lenses 104 because the reduced cost and complexity of manufacture outweighs the relative increase in accuracy contributed by the additional array 400.

Figure 5:
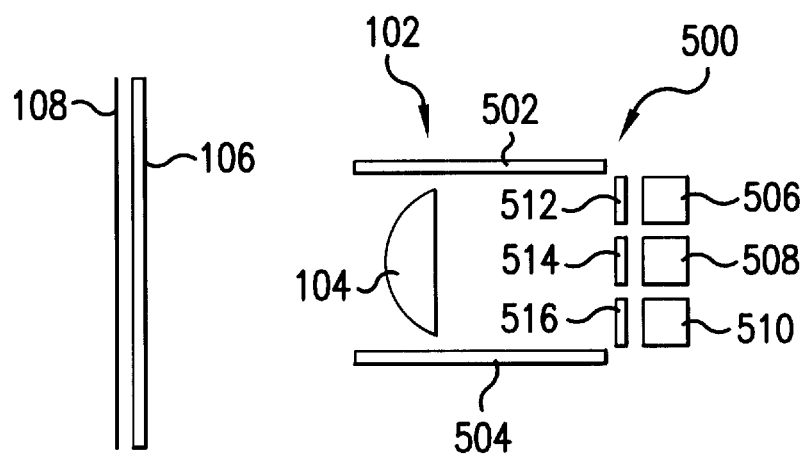
FIG. 5 is another embodiment that uses an arrangement of scanners that is different than the embodiment of FIG. 1.

FIG. 5 is a diagram of another example embodiment 500 of the scanner according to the invention. It is noted that while FIGS. 1–4 are top cross-sectional views, FIG. 5 is a side cross-sectional view. As such, the array of baffles 110 is not depicted in FIG. 5. Rather, a top baffle 502 and a bottom baffle 504 are depicted. Again, the baffles 502 and 504 are formed of light absorbent material such that they form a light absorbing border alongside an optical path between the lens 104 and imagers 506, 508 and 510. Also again, the baffles 502 and 504 help reduce the amount of unwanted light that reaches the imagers 506, 508 and 510.

In FIG. 5, the irradiating light is assumed to be white light. There are three filters 512, 514 and 516 situated between the lens 104 and the imagers 506, 508 and 510. Each of the imagers 506, 508 and 510 is identical to the imager 116 of FIG. 1. The filter 512 is a red filter. The filter 514 is a green filter. The filter 516 is a blue filter. The imagers 506, 508 and 510 image negligibly different areas of the object 108. The choice of the filter colors is variable depending upon the particular application requirements.

The embodiment 500 of the color scanner of FIG. 5 can alternatively be implemented by the embodiment of FIG. 1 where the object 108 is illuminated by three different colors of light, rather than the monochrome or white light assumed for FIG. 1. Light of a first color, e.g., from a red light emitting diode (LED), would be impinged upon the object 108 and the reflection thereof imaged by the imager 116. After the brief illumination with red light, the object 108 would be illuminated with a second color of light, e.g., from a green LED, for an equally brief interval and the reflection thereof imaged by the imager 116. After the green illumination, the object 108 would be illuminated by a third color light, e.g., from a blue LED for the same brief interval and the reflection thereof imaged by the imager 116.

For a color scanner, the embodiment using three colored LEDs is preferred to the embodiment using three imagers because the multiple imagers in the latter embodiment result in a more expensive implementation.

FIG. 6 is a top plan view of the array 110 of baffles 112 and optionally 114. The array 110 has a space 600 into which will be fitted at least one array of lenses such as the array 102. The ends of the space or gap 600 can be formed, e.g., by extending the outermost baffles 112 so that they join the outermost baffles 114.

Figure 6A:
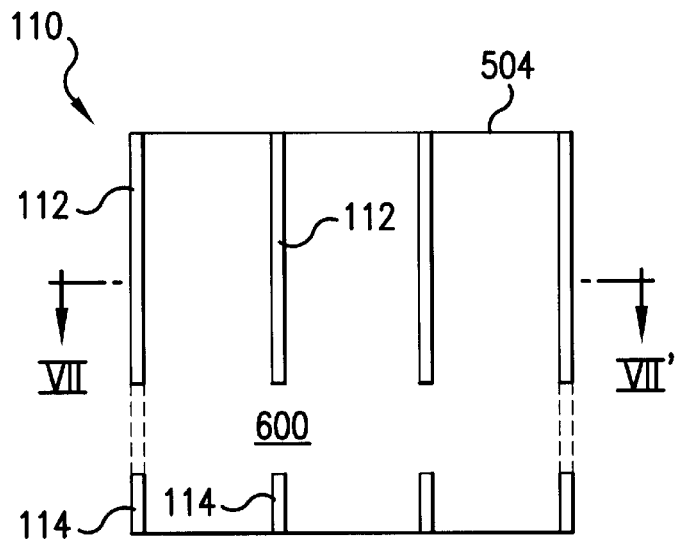
FIG. 6A depicts a point in the construction process of the scanner according to the invention.
Figure 6B:
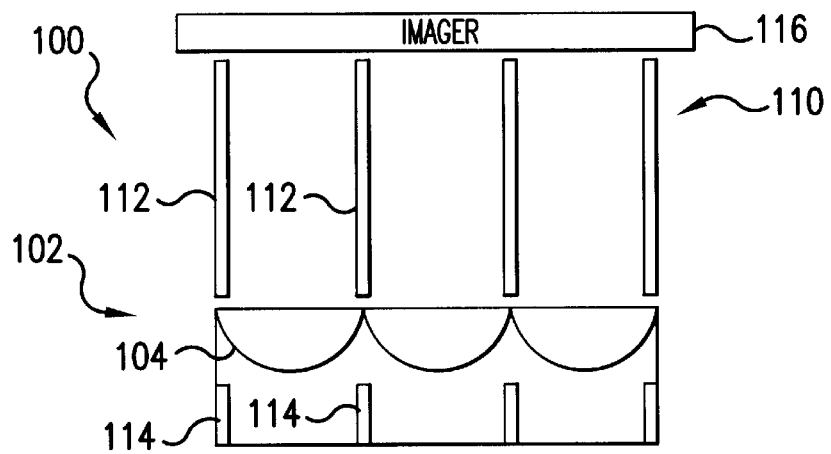
FIG. 6B depicts a later point in the construction process of the scanner according to the invention.

FIG. 6B is a top plan view of the embodiment 100 of the scanner according to the invention after the array 102 of lenses 104 has been inserted into the array 110 of baffles 112 and optionally 114, and after the imager 116 has been positioned against the end of the array 110 of baffles 112 and optionally 114.

Figure 7:
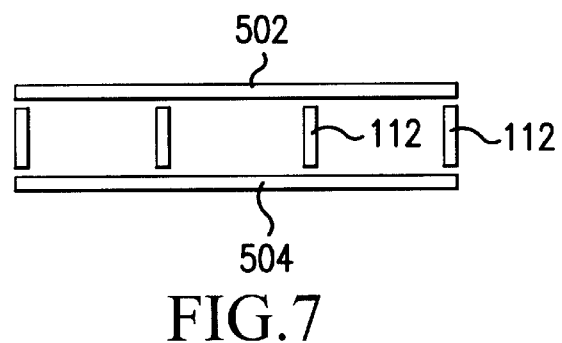
FIG. 7 depicts a cross section of the structure of FIG. 6A depicted along the line VII—VII prime.

FIG. 7 is a cross-section taken along the line VII—VII' in FIG. 6A. Note that either the top baffle 502 or the bottom baffle 504 may be integrally formed with the baffle array 110.

Figure 8:
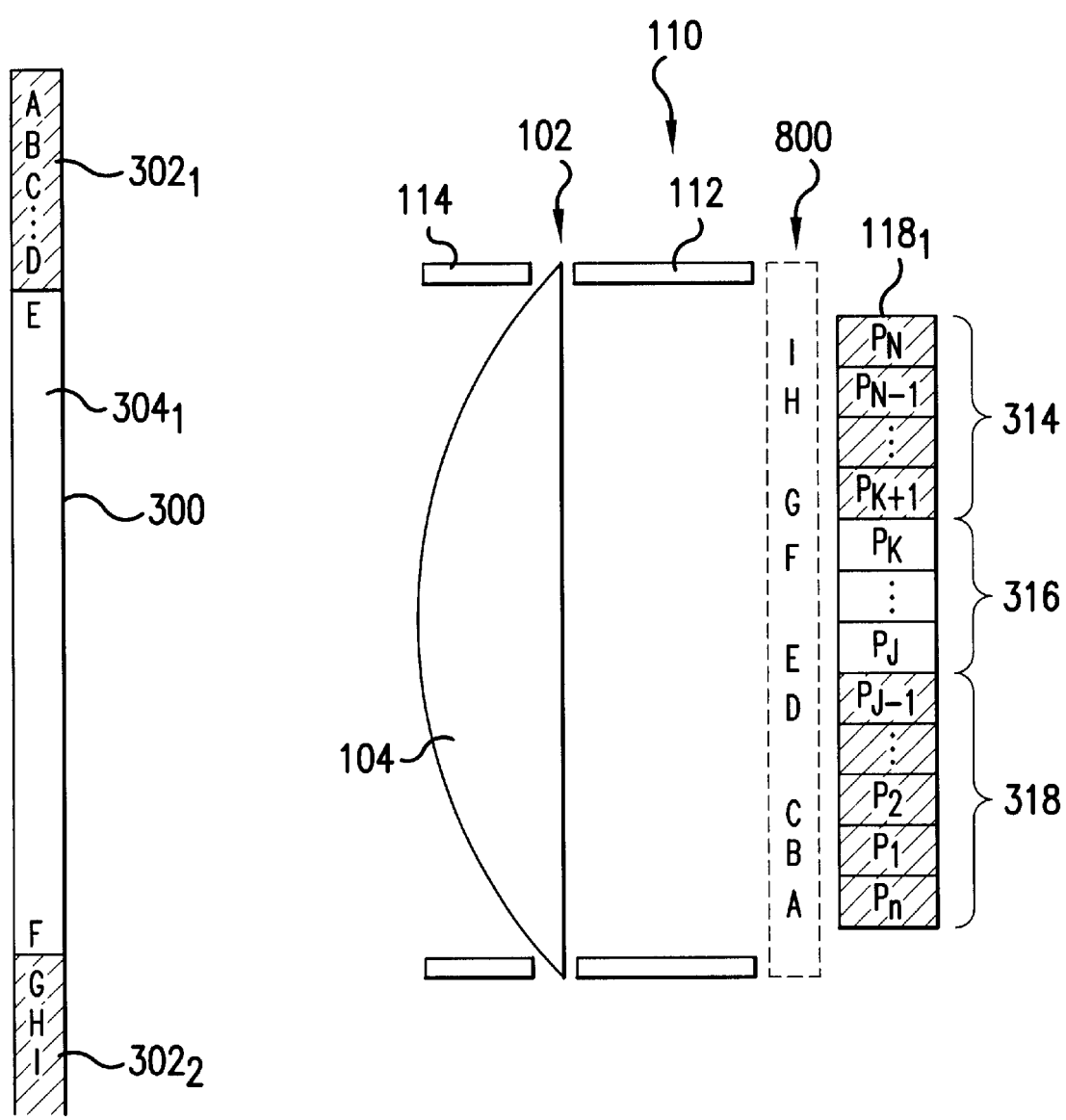
FIG. 8 is a diagram illustrating the relationship between the calibration pattern and the pixel locations in a CCD.

FIG. 8 shows a portion of FIG. 3 in more detail, for the purposes of explaining the filtration process. It is noted that the proportions in FIG. 8 have been distorted for the purposes of simplifying the depiction of the pixel locations $P_O$, $P_1$, $P_2$, ... $P_{J-1}$, $P_J$ ... $P_K$, $P_{K+1}$, ... $P_{N-1}$, $P_N$, within the CCD $118_1$.

Again, the charge distribution in the CCD $118_1$ has a beginning part 314, a middle part 316 and an end part 318. The beginning part 314 stores charge representative of the black color in pixel locations $P_{K+1}$ through $P_N$. The middle part 316 stores charge representative of the white color in pixel locations $P_{J+1}$ through $P_K$. The end part 318 stores charge representative of the color black in the pixel locations $P_0$ through $P_{J-1}$. An image 800 is impinged upon the CCD $118_1$. The regions A-I of the calibration pattern 300 are also noted in the image 800 so as to emphasize the inversion caused by the lens 104.

As discussed previously, the reduction in image size by the lens 104 makes it necessary to discard the pixels $P_0$ through $P_{J-1}$ and the pixels $P_{K+1}$ through $P_N$ while retaining the pixels $P_J$ through $P_K$. The charge distribution changes or transitions from being representative of the color black to being representative of the color white from pixels $P_{J-1}$ to $P_J$. Similarly, the charge distribution transitions from being representative of the color white to being representative of the color black from pixel $P_K$ to pixel $P_{K+1}$.

During calibration, the controller 124 can shift out the charges in the pixel locations $P_0$ through $P_N$, i.e., the image data for the pixels $P_0$ to $P_N$. The controller 124 will sort the image data $P_0$ through $P_N$ to determine the two transition points. These transition points are stored in a EEPROM 121 for the CCD 118. This process is repeated for each of the CCDs 118 such that the two transitions for each of the CCDs 118 is stored in the EEPROM 121. Once the transitions are known, the controller 124 can determine the starting pixel $P_J$ and the ending pixel $P_K$ of the image data to be saved. The image data from pixels $P_0$ to $P_{J-1}$ and $P_{K+1}$ to $P_N$ will be discarded. Again, the values for J and K will have been uniquely determined for each CCD 118.

The operation of FIG. 1 will be now be described. For simplicity, only two example light rays 132 and 134 have been depicted in FIG. 1. The rays 132 and 134 are reflections off the object 108 which pass through the platen 106 and are refracted by the lens 104 to produce data in the CCD 118 representing a reduced image. Similar processes occur in the other lenses 104 and CCDs 118. The controller sends control signals to the CCDs 118 over the control lines 128 which cause the CCDs 118 to shift their data into the memory 120. The data from each CCD 118 must be transposed. This can be done by storing the data from the CCD 118 in the memory 120 according to the order in which it is output and then transposing that array. Alternatively, the controller can perform a transposition by simply reading the data for each CCD 118 from the memory 120 in the opposite order in which it was stored from the CCD 118. The transposition technique that will be preferred depends upon the details of the particular application.

If needed, the controller can control the CCDs 118 to output their data 120 at the same time. This would, e.g., permit the next row of pixels to be irradiated and the CCDs 118 to be correspondingly energized while the controller transposed the data from the previous line of pixels in the memory 120.

The scanner 116 has been depicted with a memory 120 and a EEPROM 121 that are separate from the controller 124. Alternatively, a controller could be chosen with sufficient memory on the integrated circuit to make it possible to eliminate the separate structures 120 and 121.

The filtration process (to remove the unwanted parts of each sub-image) has been described as taking place after the transposition process. However, the filtration could be performed before the transposition; this is a matter of design choice that depends upon the details of the particular application. The advantage of performing the filtration before the transposition is that it results in less data that must be transposed, i.e., a lesser computational load upon the controller 124.

The formation of the embodiment of the scanner according to the invention will now be described in terms of FIGS. 6A and 6B. First, the array 110 of baffles 112 and optionally baffles 114 and the bottom 504 are formed by a machining or a molding process, e.g., by an injection molding process, as depicted in FIG. 6A. Next, the array 102 of lenses 104 is inserted into the corresponding gap 600 in the array 110 of baffles 112 and optionally 114, as depicted in FIG. 6B. Also, the imager 116 is attached to the end of the array 110 of baffles such that the CCDs 118 (not shown in FIG. 6B) in the imager 116 align with the lenses 104. It is noted that either the array 102 of lenses 104 can be inserted into the array 110 of baffles before the imager 116 is attached, or vice-versa.

After the imager 116 and the array 102 of lenses 104 have been put together with the array 110 of baffles 112 and optionally 114, the top baffle 502 is attached. The order of attachment of the top and bottom baffles 502 and 504 might vary depending upon the particular application.

A non-limiting example of dimensions for the embodiment 100 of the scanner according to the invention are a distance of 20 mm between the convex surfaces of the lenses 104 and the object 108, a 1.6 mm thickness of lenses 104 and a 10 mm distance between the planar surfaces of the lenses 104 and the CCDs 118. A corresponding width of the lenses 104 is 2 mm, so that a 2 mm wide portion of an object results in a 1 mm wide corresponding image of that portion on the CCDs 118 in addition to partial images from adjacent portions of the object. A corresponding width of the black portions 302 and white portions 304 of the calibration pattern 300 is 2 mm.

The calibration process preferably takes place once, preferably at the time that the scanner is manufactured. However, it may be necessary to recalibrate the scanner, depending upon the effects of aging.

A scanner should have a Modulation Transfer Function (MTF) of 50% or greater for a given line pattern at an appropriate distance from the lens array 102 to the object 108 (20 mm in the above example). As used herein, MTF is typically measured for the captured image of an industry standard line pattern of equal width black and white bars with a periodicity denoted by the number of line pairs per inch (LPI). A typical line density for a 300 dpi scanner is 70 LPI, for a 600 dpi scanner is 105 LPI and for a 1200 dpi scanner is 140 LPI. The line pattern produces a modulation in the output of the converter 117 with a greater signal corresponding to the image of a white bar (max) and a lesser signal corresponding to the image of a black bar (min). The modulation transfer function (MTF) is defined as MTF= (max−min)/ (max+min), and is expressed as a percentage. The invention is expected to have an MTF of 50% or greater for 600 dpi and 1200 dpi resolutions.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An imaging apparatus comprising:
   a lens array including a plurality of lenses, each lens in said lens array forming an inverted optical image of a portion of an object;
   an imager to convert the plurality of inverted optical images into image data, said imager including an optical-energy to electrical-energy converter, said converter producing a set of inverted image data for each lens in said array thereof; and
   a baffle array including a plurality of parallel light absorbing baffles, each baffle in said baffle array forming a light absorbing border between adjacent optical paths, said paths lying between said lens array and said imager;
   wherein each of said sets of inverted image data have a beginning part, a middle part and an end part, the apparatus further comprising
   a controller to filter said sets of inverted data so as to discard said beginning and end parts and retain said middle parts.

2. The apparatus of claim 1, the apparatus further comprising a memory, wherein said controller is operable to store a transposition of each of said middle parts of said sets of inverted image data in said memory so as to produce non-inverted middle parts corresponding to said sets of inverted image data; and
   said controller further is operable to assemble said non-inverted middle parts into a composite image of said object.

3. An imaging apparatus comprising:
   a lens array including a plurality of lenses, each lens in said lens array forming an inverted optical image of a portion of an object;
   an imager to convert the plurality of inverted optical images into image data, said imager including an optical-energy to electrical-energy converter, said converter producing a set of inverted image data for each lens in said array thereof; and
   a baffle array including a plurality of parallel light absorbing baffles, each baffle in said baffle array forming a light absorbing border between adjacent optical paths, said paths lying between said lens array and said imager;
   a memory and a controller to control said memory to store a transposition of each of said sets of inverted image data from said converter in said memory so as to produce a set of non-inverted image data corresponding to each set of inverted image data each of said sets of non-inverted image data in said memory having a beginning part, a middle part and an end part;

said controller being operable to filter said sets so as to discard said beginning and end parts and retain said middle parts; and said controller being further operable to assemble said middle parts into a composite image of said object.

4. An imaging apparatus comprising:

a lens array including a plurality of lenses, each lens in said lens array forming an inverted optical image of a portion of an object;

an imager to convert the plurality of inverted optical images into image data; and a baffle array including a plurality of parallel light absorbing baffles, each baffle in said baffle array forming a light absorbing border between adjacent optical paths, said paths lying between said lens array and said imager;

wherein each lens in said array thereof is a plano-convex lens, the planar surface of said plano-convex lens being oriented closer to said imager than said convex surface and the convex surface of said plano-convex lens being oriented closer to said object than said planar surface.

5. The apparatus of claim 4, wherein said array of plano-convex lenses is a first array thereof, the apparatus further comprising a second array of plano-convex lens located between said first array of plano-convex lenses and said object.

6. An imaging apparatus comprising:

a lens array including a plurality of lenses, each lens in said lens array forming an inverted optical image of a portion of an object;

a first imager to convert the plurality of inverted optical images into image data;

a baffle array including a plurality of parallel light absorbing baffles, each baffle in said baffle array forming a light absorbing border between adjacent optical paths, said paths lying between said lens array and said imager;

a top light absorbing baffle, arranged to cover the top of said baffle array, to form a light absorbing border above said optical paths between said lenses of said lens array and said imager; and a bottom light absorbing baffle, arranged to cover the bottom of said baffle array, to form a light absorbing border below said optical paths between said lenses of said lens array and said imager.

7. A method of calibrating an imaging apparatus, the imaging apparatus including a lens array, each lens in said lens array forming an inverted optical image of a portion of an object, an imager including an optical-energy to electrical-energy converter to convert the plurality of inverted optical images into a plurality of inverted image data sets corresponding thereto, respectively, each of said inverted data sets being a sequence of data having a beginning part, a middle part and an end part, and a controller to filter said sequence so as to discard said beginning and end parts and retain said middle part, and a baffle array, each baffle in said baffle array forming a light absorbing border between adjacent optical paths, said paths lying between said lens array and said imager, the method comprising:

providing a calibration pattern of bars alternating between a first color and a contrasting second color, wherein widths of said bars of said calibration pattern are fixed such there is a first transition and a second transition in said calibration pattern from said first color to said second color approximately aligned with a first and second edge, respectively, of each lens in said array thereof;

determining, at least indirectly based upon each of said inverted data sets, a first and second indicator of where said first transition and said second transition occur in each of said inverted data sets, respectively; and storing said first and second indicators for each of said inverted data sets.

8. The method of claim 7, further comprising:

transposing each inverted image data set to form a corresponding non-inverted data set;

wherein said step of determining determines said first and second indicators by operating directly upon said non-inverted data sets.

9. The method claim 7, wherein said step of determining determines said first and second indicators by operating directly upon said inverted data sets.

10. The method of claim 7, wherein said first color is black and said second color is white.

11. The method of claim 7, wherein said calibration pattern is a repeating pattern.

12. The method of claim 11, wherein said bars in said repeating pattern are approximately half the width of each lens in said array thereof such that an adjacent two of said bars are substantially completely imaged by each lens in said array thereof.

13. The method of claim 11, wherein each of said bars in said repeating pattern is approximately equal in width to the width of said lenses in said array thereof;

the method further comprising controlling said imager to image data corresponding to said calibration pattern such that, for each inverted data set of said plurality thereof, said beginning part and said end part are image data for said first color and said middle part is image data for said second color.

14. The method of claim 13, wherein said first and second indicators assume one of the following relations:

each of said first indicators is indicative of the last datum of said beginning part and each of said second indicators is indicative of the last datum of said middle part;

each of said first indicators is indicative of the first datum of said middle part and each of said second indicators is indicative of the first datum of said end part;

each of said first indicators is indicative of the last datum of said beginning part and each of said second indicators is indicative of the first datum in said end part; and each of said first indicators is indicative of the first datum of said middle part and each of said second indicators is indicative of the last datum in said middle part.

* * * * *